(12) United States Patent
Nigro

(10) Patent No.: US 6,948,702 B1
(45) Date of Patent: Sep. 27, 2005

(54) TRAILER HYDRAULIC LIFT

(76) Inventor: Ricky J. Nigro, 3407 Gray Whetstone St., Bandon, FL (US) 33511

( * ) Notice: Subject to any disclaimer, the term of this patent is extended or adjusted under 35 U.S.C. 154(b) by 131 days.

(21) Appl. No.: 10/369,455

(22) Filed: Feb. 20, 2003

(51) Int. Cl.⁷ .............................................. B66F 3/24
(52) U.S. Cl. .................................................... 254/423
(58) Field of Search ............................ 254/419, 420, 254/423, 93 R, 934, 2 R, 2 B, 2 C; 280/475, 280/766.1

(56) References Cited

U.S. PATENT DOCUMENTS

| | | | |
|---|---|---|---|
| 4,723,756 A | * | 2/1988 | Stumpf, Jr. ............... 254/93 H |
| 5,377,957 A | * | 1/1995 | Mosley ....................... 254/423 |
| 5,401,046 A | * | 3/1995 | Schwartz et al. ........... 254/423 |
| 6,142,501 A | * | 11/2000 | Fogo et al. ................. 254/419 |
| 6,322,062 B1 | * | 11/2001 | Conn et al. ............... 254/93 H |

* cited by examiner

*Primary Examiner*—Robert C. Watson

(57) ABSTRACT

A hydraulic lift for a truck trailer, having a pair of hydraulic cylinders mounted to the under side of a semi-trailer. The bottom of the cylinder pistons are connected to a foot, which sits on the ground. A telescoping jackstand positioned between the two cylinders, and can be locked into its extended position with a locking pin. The jackstand acts as a safety device in case the hydraulic system looses pressure, and also acts to take the load off of the hydraulic cylinders when the trailer needs to sit for extended periods of time.

8 Claims, 3 Drawing Sheets

TRAILER HYDRAULIC LIFT

BACKGROUND OF THE INVENTION

1. Field of the Invention

The present invention relates to a trailer hydraulic lift for use in connection with hydraulically controlling land gear legs for commercial semi trailers. The trailer hydraulic lift has particular utility in connection with adjusting the height of a trailer with a hydraulic lift and securing it with a telescoping jackstand.

2. Description of the Prior Art

Trailer hydraulic lifts are desirable for hydraulically controlling landing gear legs for commercial semi trailers.

The use of trailer hydraulic lifts is known in the prior art. For example, U.S. Pat. No. 5,217,209 to Anders discloses a trailer hydraulic lift with a hinged stowed position controlled by a positioning hydraulic cylinder. However, the Anders '209 patent does not disclose the use of a telescoping jackstand positioned between the lifting cylinders.

U.S. Pat. No. 3,341,170 to Smith discloses a hydraulic jack trailer support that is held rigid by a bracing means. However, the Smith '170 patent does not disclose the use of a telescoping jackstand for safety and provides no way to remove the load on the struts for long term positioning.

Lastly, U.S. Pat. No. 5,299,829 to Rivers, et al. discloses a pneumatic system for operating semi trailer landing gear that uses a pneumatic gear motor attached to a gear reduction box to control the landing gear. However, the '829 patent does not provide for a jackstand, and does not provide a means to remove the load from the pneumatic struts.

While the above-described devices fulfill their respective, particular objectives and requirements, the aforementioned patents do not describe a trailer hydraulic lift that allows adjusting the height of a trailer with a hydraulic lift and securing it with a telescoping jackstand. The Anders patent makes no provision for any means to remove the load from the landing gear struts.

Therefore, a need exists for a new and improved trailer hydraulic lift that can be used for adjusting the height of a trailer with a hydraulic lift and securing it with a telescoping jackstand. In this regard, the present invention substantially fulfills this need. In this respect, the trailer hydraulic lift according to the present invention substantially departs from the conventional concepts and designs of the prior art, and in doing so provides an apparatus primarily developed for the purpose of adjusting the height of a trailer with a hydraulic lift and securing it with a telescoping jackstand.

SUMMARY OF THE INVENTION

In view of the foregoing disadvantages inherent in the known types of hydraulic landing gear lifts now present in the prior art, the present invention provides an improved trailer hydraulic lift, and overcomes the above-mentioned disadvantages and drawbacks of the prior art. As such, the general purpose of the present invention, which will be described subsequently in greater detail, is to provide a new and improved trailer hydraulic lift which has all the advantages of the prior art mentioned heretofore and many novel features that result in a trailer hydraulic lift which is not anticipated, rendered obvious, suggested, or even implied by the prior art, either alone or in any combination thereof.

To attain this, the present invention essentially comprises a hydraulic lift having a pair of hydraulic cylinders mounted to the under side of a semi-trailer. The bottom of the cylinder pistons are connected to a foot, which sits on the ground. A telescoping jackstand positioned between the two cylinders, and can be locked into its extended position with a locking pin. The jackstand acts as a safety device in case the hydraulic system looses pressure, and also acts to take the load off of the hydraulic cylinders when the trailer needs to sit for extended periods of time.

Of course, the invention also includes a hydraulic pump and a hydraulic fluid reservoir to operate the cylinders. Also, the invention can have a control box, with an on/off switch, an up/down control lever, and a precise up/down control knob. Finally, the invention could be constructed with varying numbers and configurations of hydraulic cylinders, depending on the strength of the cylinders.

There has thus been outlined, rather broadly, the more important features of the invention in order that the detailed description thereof that follows may be better understood and in order that the present contribution to the art may be better appreciated.

The invention may also include a hinged mounting to connect the trailer hydraulic lift to the trailer, so that it can fold up and sustain less damage while traveling. This configuration might also have a third hydraulic cylinder for raising and lowering the pair of hydraulic cylinders and the jackstand to and from a stowed position parallel to the bottom of said trailer.

There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved trailer hydraulic lift that has all of the advantages of the prior art trailer hydraulic lifts and none of the disadvantages.

It is another object of the present invention to provide a new and improved trailer hydraulic lift that may be easily and efficiently manufactured and marketed.

An even further object of the present invention is to provide a new and improved trailer hydraulic lift that has a low cost of manufacture with regard to both materials and labor, and which accordingly is then susceptible of low prices of sale to the consuming public, thereby making such trailer hydraulic lift economically available to the buying public.

Still another object of the present invention is to provide a new trailer hydraulic lift that provides in the apparatuses and methods of the advantages thereof while simultaneously overcoming some of the disadvantages normally associated therewith.

Even still another object of the present invention is to provide a trailer hydraulic lift for adjusting the height of a trailer with a hydraulic lift and securing it with a telescoping jackstand. This is a safety feature for protection in case of a hydraulic failure, and it also allows the trailer to be left supported on the lift for long periods of time without danger that the height will drop if pressure is lost in the hydraulic system.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 2:
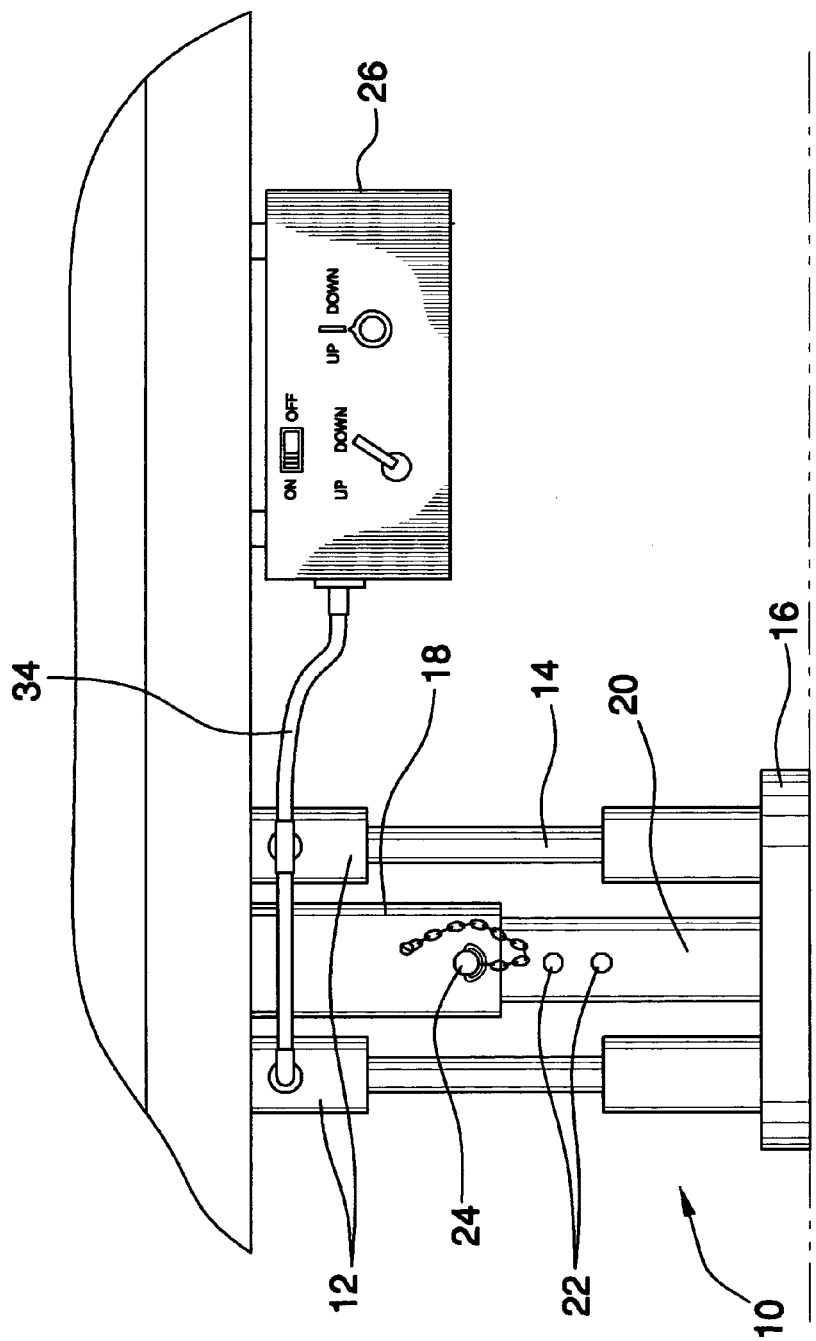
FIG. 2 is a close up side view of the trailer hydraulic lift of the present invention, in the area of the circle 2 in FIG. 1.

Referring now to the drawings, and particularly to FIG. 2, a present preferred embodiment of the trailer hydraulic lift of the present invention is shown and generally designated by the reference numeral 10.

Figure 1:
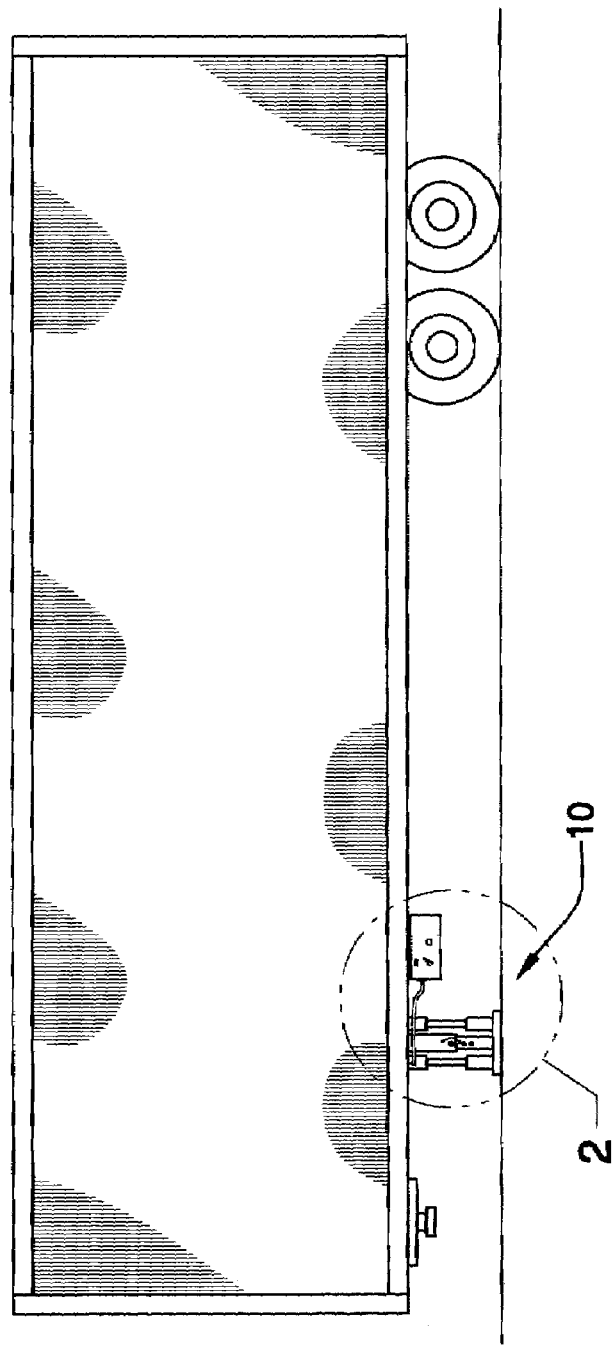
FIG. 1 is a side view of the present embodiment of the trailer hydraulic lift constructed in accordance with the principles of the present invention, installed on a trailer.

In FIG. 1, a new and improved trailer hydraulic lift 10 of the present invention for adjusting the height of a trailer with a hydraulic lift and securing it with a telescoping jackstand is illustrated and will be described. More particularly, the trailer hydraulic lift 10 is shown attached to a trailer. The lift 10 would be attached toward the front of the trailer in the normal place for trailer landing gear.

Continuing to FIG. 2, where a close up view of the present embodiment of the invention is shown, the trailer hydraulic lift 10 has a pair of hydraulic cylinders 12, each cylinder receiving a piston 14. The cylinders 12 are connected at the tops thereof to a trailer, and at the bottoms to a foot 16, which will rest on the ground as a normal trailer landing pad foot would rest. Between the cylinders is a jackstand 18, said jackstand connected at the top thereof to the trailer. Next, the jackstand 18 has a telescoping member 20, which is connected to the foot 16 between the two pistons 14. The telescoping member 20 and the jackstand 18 are each provided with a set of matching holes 22 formed in the surfaces thereof. These holes provide a place to insert the locking pin 24. There must be provided sufficient cylinder 12 and piston 14 lengths that the front end of the trailer can not only be leveled, but be lifted sufficiently to permit insertion of the working deck of a tractor under the trailer whereby to engage the trailer.

The cylinders 12 are supplied with hydraulic pressure by being connected to a hydraulic pressure line 34, which is connected at the other end to the control box 26. The control box 26 is provided with a an on/off switch, an up/down control switch, and a fine up/down control knob for precise control (not separately numbered). Also, the control box 26 contains control circuitry, valves, and connections needed to control the hydraulic pump (not shown in this FIGURE) and to control pressure in the hydraulic pressure line 34.

Figure 3:
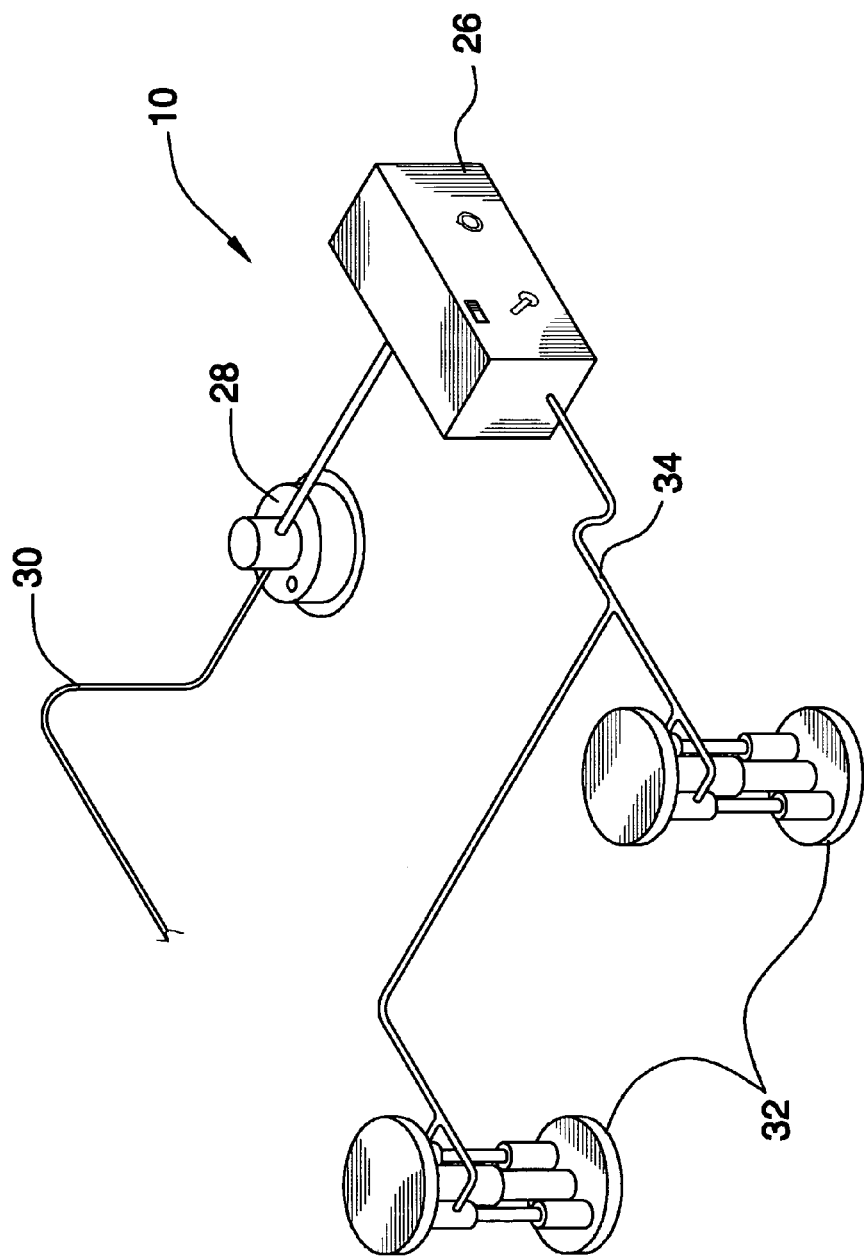
FIG. 3 is a perspective view of the trailer hydraulic lift of the present invention.

Referring finally to FIG. 3, where a perspective view of another embodiment of the invention is shown not connected to a trailer, this embodiment is provided with two hydraulic lift units 32, each of which comprise the elements shown in FIG. 2. These units are supplied by the hydraulic pressure lines 34, which are controlled through the control box 26, and supplied with pressure and fluid from the hydraulic pump and reservoir 28. The pump and reservoir 28 is supplied with power from the tractor unit power system by a power line 30. The pump and reservoir 28 must be of sufficient strength to provide lifting power to lift a fully loaded trailer.

In use, it can now be understood that the cylinders are the dollies that will raise or lower the trailer as desired and hold the trailer in place. The jackstand 18 can be engaged to hold weight in case of a rupture of a hydraulic line or fitting, and enable the trailer to be left for long periods without worry of leakage from a fitting. The user will use the hydraulic trailer lift 10 when they need to attach or detach a trailer from a tractor. The attachment is of course done by turning on the on/off switch, raising the lift 10 to a sufficient height that its lowest part clears the working deck of the tractor by operating the up/down control and up/down fine control, then backing the tractor underneath and lowering the trailer with the same controls. Detachment is exactly the reverse process.

While a preferred embodiment of the trailer hydraulic lift has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable material such as metal or composite may be used for the hydraulic lines described, and the control box could be made of any rugged material such as metal and could even be diamond plated for ruggedness. Also, the cylinder 12 and piston 14 will be made of metal as typically used in high load bearing hydraulic applications. And although adjusting the height of a trailer with a hydraulic lift and securing it with a telescoping jackstand have been described, it should be appreciated that the trailer hydraulic lift herein described is also suitable for many other lifting applications where a safety and load bearing feature is desirable. Furthermore, a wide variety of configurations may be used instead of the one described, either with one cylinder combined with a jackstand 18, or with several lift units, each one comprising one or more cylinders and a jackstand. Or the invention could be hingedly attached to the trailer and lowered in place when needed, perhaps automatically with a lifting cylinder attached to the bottom of the trailer at one end and somewhere along the jackstand 18 at the other end. Finally changes could be made to achieve the same function as described. For example, the locking pin 24 can replaced with any of a variety of locking mechanisms, or the power line 30 can be replaced with a dedicated power system.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A trailer hydraulic lift comprising:
    a pair of hydraulic cylinders mounted at the tops thereof adjacent the front portion of a semi-trailer to the under side of said trailer, each of said cylinders having a piston rod extendable therefrom and retractable thereinto;
    a foot connecting the pair of hydraulic cylinders at the bottoms thereof,
    a jackstand positioned between the two cylinders, said jackstand having a telescopic member connected to said foot and a base member mounted to said trailer, said base member and said telescopic member being provided with matching holes formed through each member,
    a locking pin, said locking pin of size needed to fit through said matching holes;
    a hydraulic pump and a hydraulic fluid reservoir enabling the forced function of the said first and second hydraulic cylinders in piston extension and retraction;
    wherein said trailer hydraulic lift can be operated to raise and lower the front of said trailer to enable attachment to a tractor, and said telescoping jackstand can be locked in place to secure said trailer height for safety or for long term positioning of the trailer.

2. The trailer hydraulic lift of claim 1, further comprising a control box, said control box having an on/off switch, and an up/down control lever.

3. The trailer hydraulic lift of claim 1, further comprising a control box having a precise up/down control knob.

4. The trailer hydraulic lift of claim 1, further comprising a dedicated power system connected to the hydraulic pump.

5. A trailer hydraulic lift comprising:
    a plurality of hydraulic lift units, each lift unit having a pair of hydraulic cylinders mounted at the tops thereof adjacent the front portion of a semi-trailer to the under side of said trailer, each of said cylinders having a piston rod extendable therefrom and retractable thereinto, a foot connecting the pair of hydraulic cylinders at the bottoms thereof, a jackstand positioned between the two cylinders, said jackstand having a telescopic member connected to said foot and a base member mounted to said trailer, said base member and said telescopic member being provided with matching holes formed through each member, a locking mechanism supplied on said jackstand;
    a hydraulic pump and a hydraulic fluid reservoir enabling the forced function of the said hydraulic lift units in piston extension and retraction;
    wherein said trailer hydraulic lift can be operated to raise and lower the front of said trailer to enable attachment to a tractor, and said telescoping jackstands can be locked in place to secure said trailer height for safety or for long term positioning of the trailer.

6. The trailer hydraulic lift of claim 5, further comprising a control box having an on/off switch, and an up/down control lever.

7. The trailer hydraulic lift of claim 5, further comprising a control box, said control box having a precise up/down control knob.

8. The trailer hydraulic lift of claim 5 further comprising a dedicated power system connected to the hydraulic pump.

* * * * *